(12) United States Patent
Raleigh

(10) Patent No.: US 10,399,025 B2
(45) Date of Patent: Sep. 3, 2019

(54) WATER SEPARATION FOR A SYSTEM USING A PSA PROCESS

(71) Applicant: Carleton Life Support Systems, Inc., Davenport, IA (US)

(72) Inventor: Timothy Raleigh, Long Grove, IA (US)

(73) Assignee: Carleton Life Support Systems Inc., Davenport, IA (US)

( * ) Notice: Subject to any disclaimer, the term of this patent is extended or adjusted under 35 U.S.C. 154(b) by 133 days.

(21) Appl. No.: 15/783,305

(22) Filed: Oct. 13, 2017

(65) Prior Publication Data

US 2018/0104631 A1   Apr. 19, 2018

Related U.S. Application Data

(60) Provisional application No. 62/407,856, filed on Oct. 13, 2016.

(51) Int. Cl.
*B01D 46/00* (2006.01)
*B01D 46/24* (2006.01)
*B01D 53/047* (2006.01)

(52) U.S. Cl.
CPC ......... *B01D 46/0031* (2013.01); *B01D 46/00* (2013.01); *B01D 46/0005* (2013.01); *B01D 46/2411* (2013.01); *B01D 46/2414* (2013.01); *B01D 53/047* (2013.01)

(58) Field of Classification Search
CPC .. B01D 53/047; B01D 46/00; B01D 46/0005; B01D 46/0031; B01D 46/2411; B01D 46/2414

USPC ...................... 55/490, 511, 392, 428; 96/134
See application file for complete search history.

(56) References Cited

U.S. PATENT DOCUMENTS

| | | | | | |
|---|---|---|---|---|---|
| 2,707,563 | A | * | 5/1955 | Walter | B01D 29/46 210/301 |
| 2,771,153 | A | * | 11/1956 | Hennig | B01D 46/002 55/350.1 |
| 3,791,105 | A | * | 2/1974 | Rhodes | B01D 39/1623 55/322 |
| 4,240,908 | A | * | 12/1980 | Swain | B01D 17/045 156/191 |
| 4,897,094 | A | * | 1/1990 | Maeda | B01D 46/0012 55/323 |
| 4,941,900 | A | | 7/1990 | Cordes | |

(Continued)

FOREIGN PATENT DOCUMENTS

WO   2008103736   8/2008

*Primary Examiner* — Frank M Lawrence, Jr.
(74) *Attorney, Agent, or Firm* — Woods Oviatt Gilman LLP; Katherine H. McGuire, Esq.

(57) ABSTRACT

A coalescing filter includes a housing, a top fitting and bottom fitting. The housing includes a sidewall defining a central chamber configured to receive a filter element therein. The top fitting is coupled to a top end of the housing and includes an inlet port configured to receive a moist source gas and direct the source gas into the filter element. The bottom fitting is coupled to a bottom end of the housing and includes an outlet orifice configured to discharge a dry product gas. The bottom fitting includes a pedestal configured to extend within the central chamber a spaced distance from the plurality of sidewalls. The pedestal is configured to seat the filter element thereon and further includes an outlet port in fluid communication with the outlet orifice.

9 Claims, 5 Drawing Sheets

(56) References Cited

U.S. PATENT DOCUMENTS

| | | | | |
|---|---|---|---|---|
| 5,284,997 A | * | 2/1994 | Spearman | B01D 46/0024 141/99 |
| 5,415,676 A | | 5/1995 | Tokar et al. | |
| 2004/0118092 A1 | * | 6/2004 | Tran | B01D 46/0031 55/423 |
| 2006/0236867 A1 | | 10/2006 | Neary | |
| 2007/0175191 A1 | * | 8/2007 | Ziebold | B01D 46/0031 55/482 |
| 2012/0279252 A1 | | 11/2012 | Carlin et al. | |

\* cited by examiner

WATER SEPARATION FOR A SYSTEM USING A PSA PROCESS

FIELD OF THE INVENTION

The present invention generally relates to coalescing filters, and more particularly to a coalescing filter configured for use within a pressure-swing-adsorption (PSA) system, and still more particularly to a coalescing filter having a non-cylindrically shaped housing configured for improved water separation capability.

BACKGROUND OF THE INVENTION

Pressure-swing-adsorption (PSA) uses sharp pressure changes within one or more chambers filled with molecular sieve to separate various components in a feed gas. For example, the PSA process may be used in conjunction with zeolite molecular sieve material to separate oxygen and argon from the feed gas. The PSA process is more efficient at separating oxygen from air than other methods (e.g. cryogenics), but it also has some drawbacks. One drawback is that the molecular sieve has a high affinity for water. Water ingestion by the molecular sieve causes a significant drop in gas separation performance. In addition, while many PSA systems include features for removing liquid water that might be present in the compressed air, most oxygen-generating PSA systems do not have a suitable means for drying the compressed air that is fed into the sieve beds. As a result, the sieve beds are typically exposed to some amount of water present in the compressed air.

The two most common methods for removing liquid water upstream of the molecular sieve beds are the use of coalescing filters and centrifugal water separators. Coalescing filters are commonly used in industrial applications and are very effective at removing small liquid droplets from compressed air streams. Coalescing filters work by joining small droplets together to form large droplets that are channeled to a drain for removal from the system. This process may work well for constant air flows, but the PSA process has large swings in air flow through the filter as the sieve beds cycle between separation and regeneration phases. As a result, the cyclical air flow through the filter driven by the PSA process lowers the water separation capability of the coalescing filter to catch small water droplets and combine them into larger droplets. While some of these droplets reach sufficient mass to flow down to the drain, many droplets, unfortunately, get caught in a medium range where they are too small to be overcome by gravity but are also too large to remain on the filter during peak flow through the filter. These water droplets typically come off the filter element and deposit on the inside wall of the filter housing. Some of these droplets may still join together and flow to the drain as desired, but other droplets may slowly migrate towards the filter housing outlet and eventually flow to downstream components.

Centrifugal water separators have also proven to be very effective at removing liquid water from compressed air. These water separators work by directing compressed air in such a way to use inertia to help small water droplets join together and flow to a drain. The major drawbacks for centrifugal water separators are their size and the fact that they are often separate units from the PSA concentrator and must be supported separately.

Thus, there is a need for a coalescing filter for a PSA system with improved water separation capability thereby eliminating the need for a separate centrifugal water separator. The present invention satisfies this as well as other needs.

SUMMARY OF THE INVENTION

In view of the above and in accordance with an aspect of the present invention, the present invention is generally directed to a coalescing filter which includes a housing, a top fitting and bottom fitting. The housing includes a sidewall defining a central chamber configured to receive a filter element therein. The top fitting is coupled to a top end of the housing and includes an inlet port configured to receive a moist source gas and direct the source gas into the filter element. The bottom fitting is coupled to a bottom end of the housing and includes an outlet orifice configured to discharge a dry product gas. The bottom fitting includes a pedestal configured to extend within the central chamber a spaced distance from the plurality of sidewalls. The pedestal is configured to seat the filter element thereon and further includes an outlet port in fluid communication with the outlet orifice.

In a further aspect of the present invention, the sidewall comprises a plurality of sidewall panels wherein adjacent sidewall panels are joined at a vertex. The plurality of sidewall panels may be planar or may include a concave curvature relative to a central axis of the housing.

In still another aspect of the present invention, the bottom fitting further defines a plurality of pockets. A respective pocket may be located proximate a respective vertex and each respective pocket may be in fluid communication with a respective pair of sidewall panels. The bottom fitting may further define a plurality of drains wherein a respective drain is in fluid communication with a respective pocket. Droplets extracted from the moist source air may then exit the coalescing filter through one of the plurality of drains. Also, the outlet port may be located a spaced distance above the plurality of drains.

In another aspect of the present invention, the plurality of sidewalls is four, but it should be noted by those skilled in the art that the number of sidewall may be any suitable number.

DESCRIPTION OF A PREFERRED EMBODIMENT OF THE INVENTION

Figure 1:
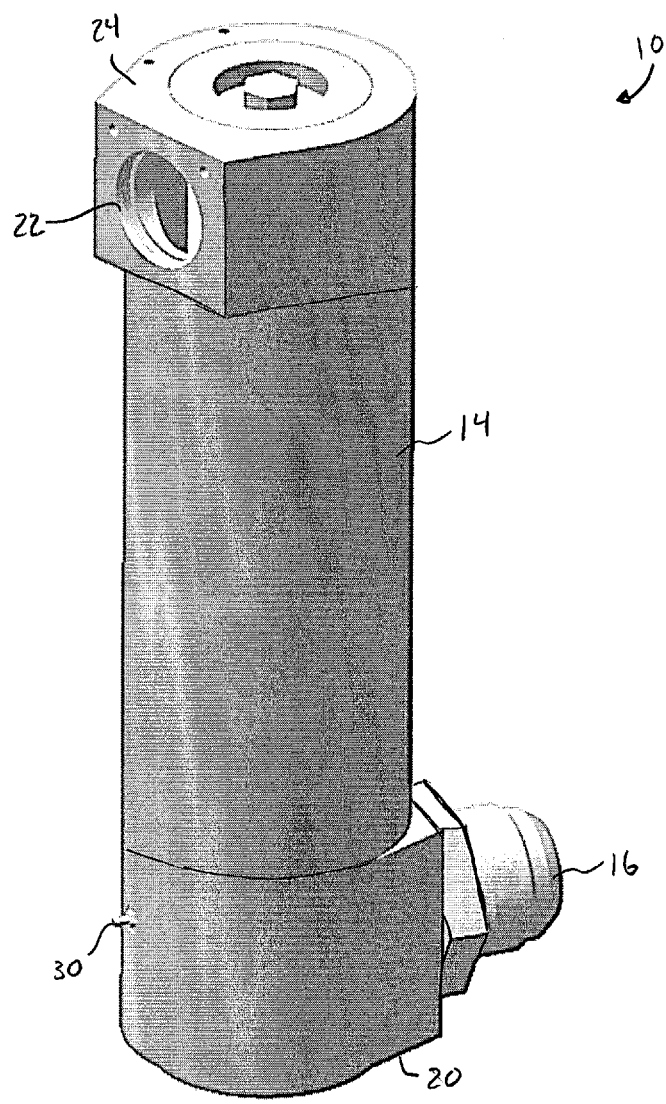
FIG. 1 is a perspective view of a prior art coalescing filter.
Figure 2:
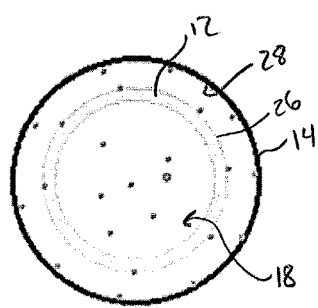
FIG. 2 is a lateral cross sectional view of the coalescing filter shown in FIG. 1.
Figure 3:
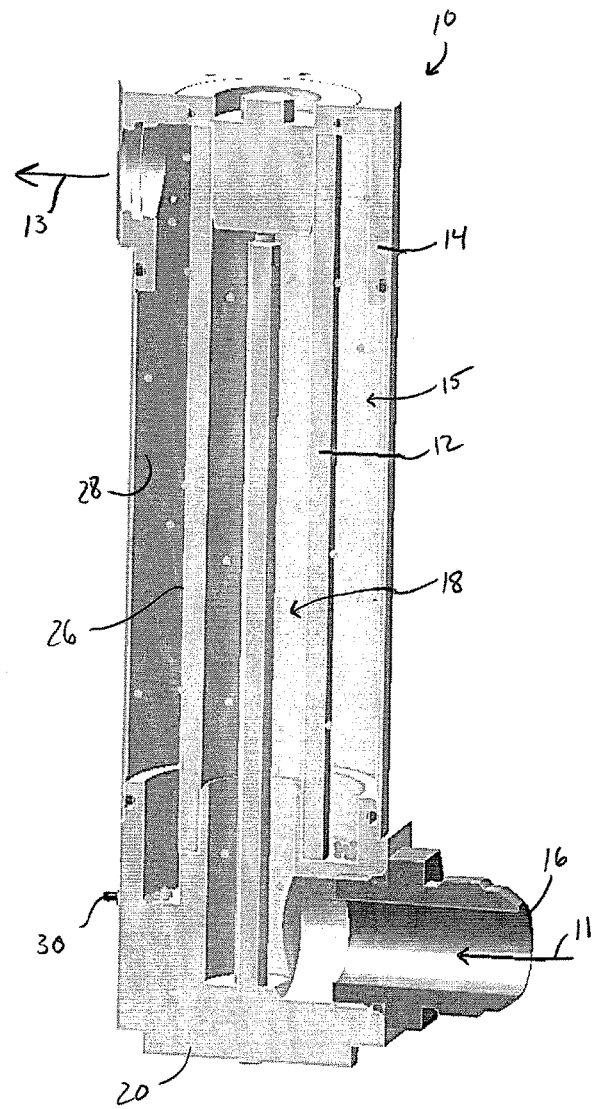
FIG. 3 is a longitudinal cross sectional view the coalescing filter shown in FIG. 1.

Referring now to FIGS. 1 through 3, a prior art coalescing filter 10 generally includes a coalescing filter element 12 concentrically located within a cylindrical filter housing 14. Coalescing filter 10 further includes an air inlet port 16 through which a moist source gas 11 may enter filter housing 14 into interior cavity 18 defined by the inner volume of filter element 12. Air inlet 16 may be generally located proximate bottom wall 20 of filter housing 14 while an air outlet port 22 is located proximate top wall 24 of filter housing 14 for outputting product gas 13.

In operation, moist source gas 11 is fed into interior cavity 18 and passes through filter element 12 into outer annular chamber 15 where liquid within source gas 11 may gather as droplets and form greater and greater sized droplets by joining together. These droplets continue to aggregate until the enlarged droplets possess sufficient mass such that the force of gravity exerted on the droplet overcomes the adhesive bonding between the droplet and the external surface 26 of filter element 12 or internal surface 28 of filter house 14, at which point the droplets will migrate toward bottom wall 20.

A drain 30 may be formed within filter housing 14 proximate bottom wall 20 through which the collected droplets may be removed from coalescing filter 10. In this manner, product gas 13 may be at least partially dried before being directed to downstream components of the PSA system, such as the zeolite beds (not shown). However, it should be noted that PSA systems may generally include a further intermediary drying device, such as a centrifugal water separator, between the coalescing filter and the zeolite beds in an attempt to more thoroughly remove moisture from the source gas before the gas enters the zeolite beds of the PSA system.

In accordance with an aspect of the present invention, a coalescing filter housing geometry has been developed which seeks to improve the water separation capability of the coalescing filter for use in a PSA system so that the need for a separate centrifugal water separator may be eliminated. By way of example, improved water separation capability may include encouraging small droplets to join together so as to more efficiently and completely form larger droplets and decoupling the outlet port from the housing wall where the water droplets gather.

With reference to FIGS. 4 through 8, an embodiment of a coalescing filter 50 in accordance with an aspect of the present invention may generally include a filter housing 52 having a non-circular lateral cross section. By way of example and as shown through FIGS. 4 through 8, filter housing 52 may be comprised of four sidewalls 54, 56, 58, 60 curved to present a concave profile relative to a centrally mounted coalescing filter element 12. Each successive sidewall 54, 56, 58, 60 may be joined at a respective vertex 62, 64, 66, 68. In this manner, curved sidewalls 54, 56, 58, 60 may be configured to define a central chamber 70 generally shaped like a four-pointed star within which is received filter element 12.

Figure 4:
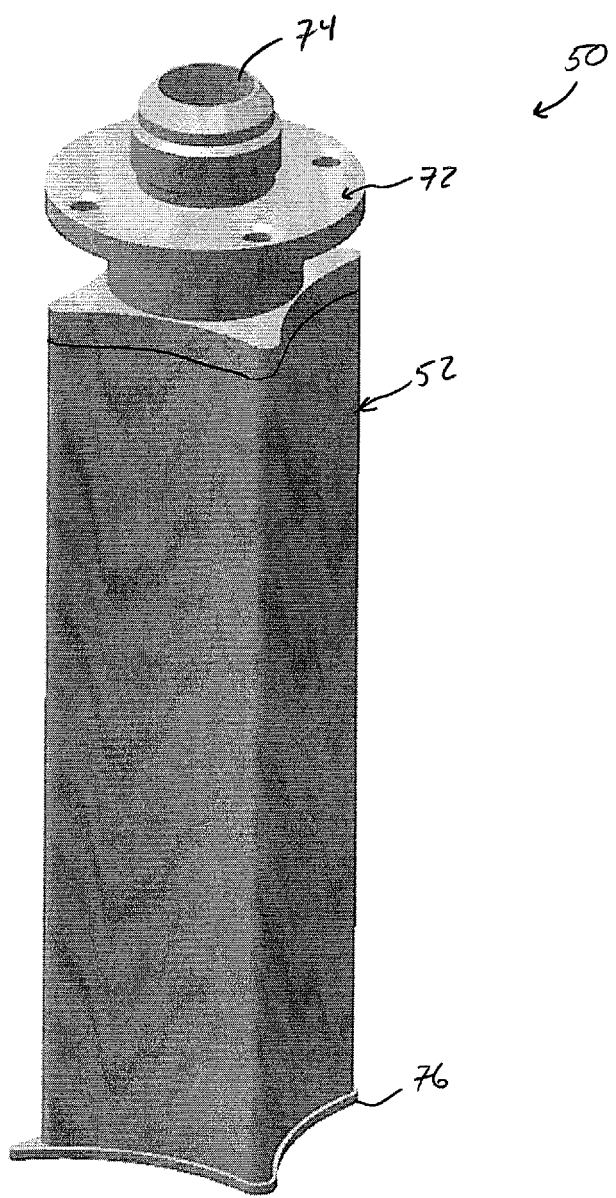
FIG. 4 is a perspective view of a coalescing filter in accordance with an embodiment of the present invention.
Figure 5:
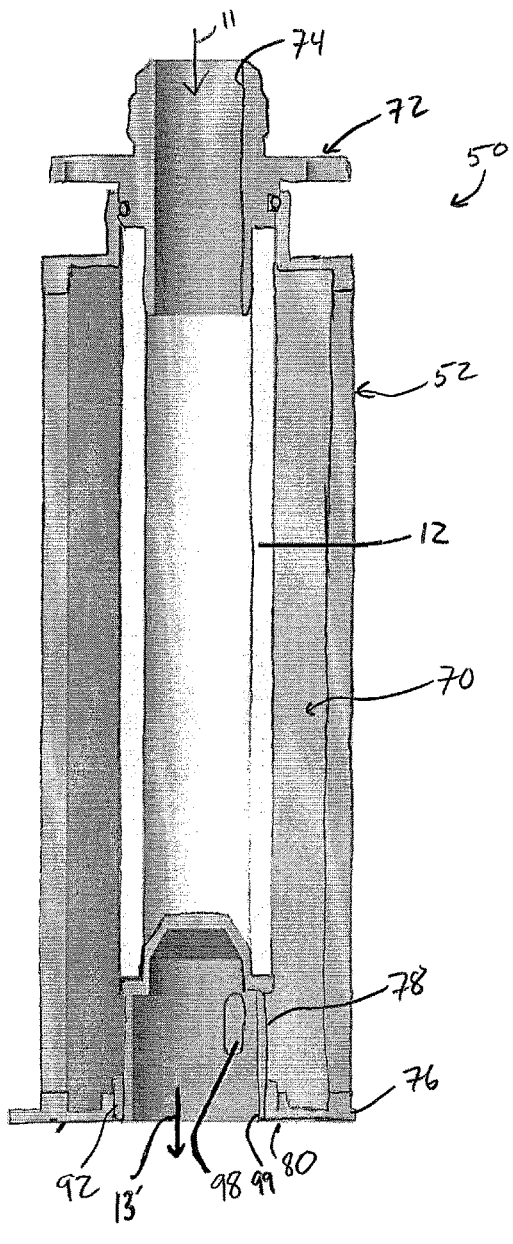
FIG. 5 is a longitudinal cross sectional view of the coalescing filter shown in FIG. 4.
Figure 6:
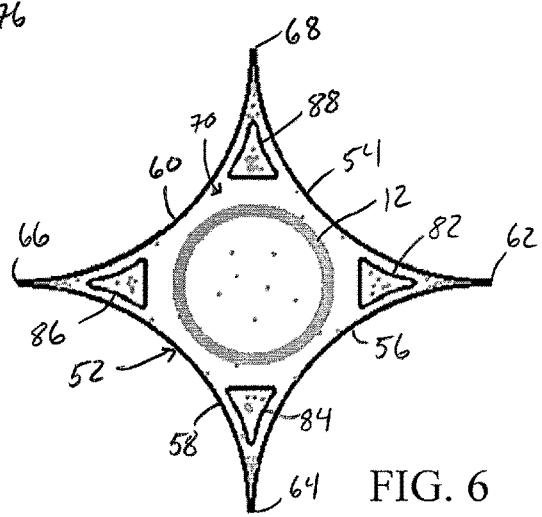
FIG. 6 is a lateral cross sectional view of the coalescing filter shown in FIG. 4.
Figure 7:
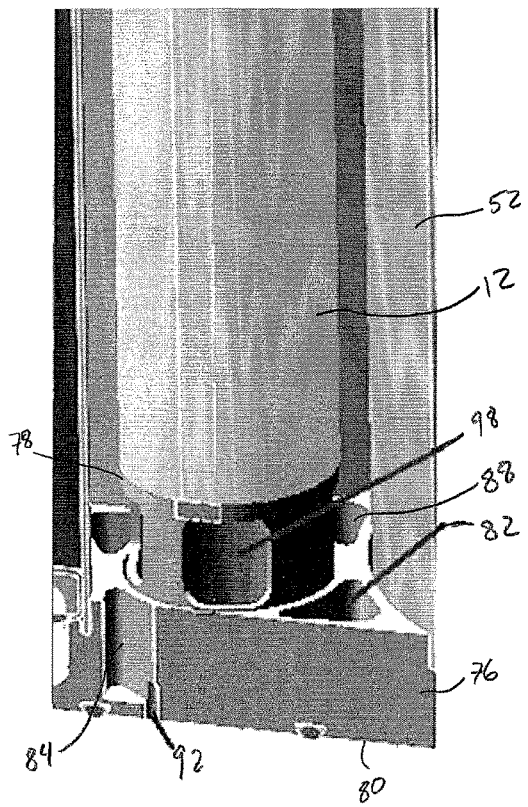
FIG. 7 is a fragmented, perspective view showing the filter element and pedestal of the coalescing filter shown in FIG. 4.

As shown most clearly in FIGS. 4 and 5, filter housing 52 may further include a top portion 72 defining an inlet port 74 configured to receive a source gas as described above. The opposing bottom portion 76 may include a pedestal 78 configured to seat filter element 12 thereon. Pedestal 78 positions filter element 12 a spaced distance above housing bottom wall 80. Four pockets 82, 84, 86, 88 are defined within bottom portion 76, wherein a respective pocket is located proximate to a respective vertex 62, 64, 66, 68 of star shaped filter housing 52. Each respective pocket 82, 84, 86, 88 may communicate with the internal surface of a respective successive sidewall 54, 56, 58, 60. Droplets that migrate down the sidewalls as described above may then be collected within a pocket 82, 84, 86, 88. A respective drain 90, 92, 94, 96 may be defined within a respective pocket 82, 84, 86, 88 whereby any collected droplets may pass through bottom wall 80 and out of coalescing filter 50. Pedestal 78 may further include one or more outlet ports 98 located a spaced distance above bottom wall 80 and drains 90, 92, 94, 96. Bottom wall 80 may define an outlet orifice 99 wherein outlet ports 98 may be in fluid communication with outlet orifice 99 whereby product gas 13' may exit coalescing filter 50 by passing through outlet orifice 99.

Without limitation to any specific theory, it is believed that, unlike filter housings having a circular lateral cross section (e.g., see FIGS. 1 through 3 as described above) where droplets migrate substantially linearly down the housing sidewall and are joined only through a random occurrence, the curved sidewalls 54, 56, 58, 60 and vertices 62, 64, 66, 68 of star shaped filter housing 52 may encourage droplets to migrate toward a respective vertex 62, 64, 66, 68 under influence of the wall curvature. As the droplets progress closer to a vertex 62, 64, 66, 68, the probability of one droplet encountering another droplet increases due to the increasing proximity of the opposing sidewalls meeting at the vertex. As a result, the droplets are more likely to join together to form larger and larger droplets. Once sufficiently large enough, the enlarged droplets may then migrate towards a drain 90, 92, 94, 96 as described above. Moreover, by decoupling outlet ports 98 from filter housing 52 and elevating each outlet port 98 above bottom wall 80 and drains 90, 92, 94, 96, droplets may flow into drains 90, 92, 94, 96 with reduced chance of an entering outlet port 98. As a result, product gas 13' may have a reduced moisture content compared to current coalescing filters known in the art, e.g., coalescing filter 10 described above. In accordance with an aspect of the present invention, product gas 13' may have sufficiently low moisture content so as to eliminate the need for a further downstream water separator, such as a centrifugal water separator, when coalescing filter 50 is mounted within a PSA system.

Figure 8:
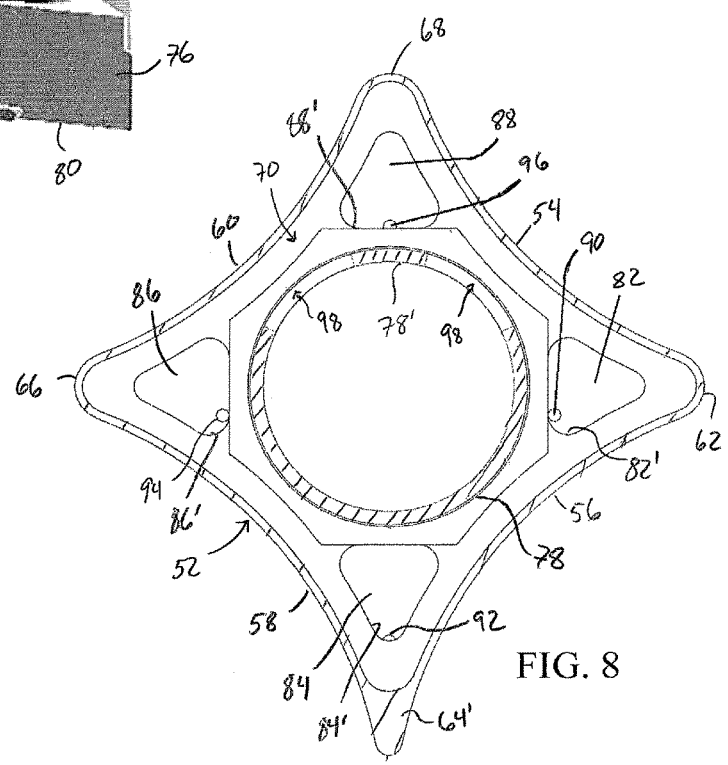
FIG. 8 is a lateral cross sectional view of the pedestal of the coalescing filter shown in FIG. 4.

With reference to FIG. 8, in accordance with one aspect of the present invention, coalescing filter 50 may be configured to be mounted within a system, such as an oxygen generating PSA system, in either a vertical (FIGS. 4 and 5) or horizontal (FIG. 8) orientation with respect to the longitudinal axis of filter housing 52. Heretofore, coalescing filter units, such as coalescing filter 10, have been designed to operate in only one orientation. As described above, coalescing filter 10 has been designed to operate in a vertical orientation with drain 30 located at the bottom of the unit. A different coalescing filter would be required if the filter is to be installed in a horizontal orientation such that the location of the inlet and outlet ports and drains may be arranged to ensure that water drains properly from the filter housing while minimizing exiting through the gas outlet port.

Returning to FIG. 8, drains 90, 92, 94, 96 and outlet ports 98 may be configured to minimize passage of moisture through outlet ports 98 when filter housing 52 is mounted in a horizontal orientation. Drains 90, 92, 94, 96 may be positioned proximate a bottom wall portion 82', 84', 86' 88' of respective pockets 82, 84, 86, 88. In this manner, any moisture collected within pockets 82, 84, 86, 88 will migrate toward bottom wall portions 82', 84', 86' 88' due to the force of gravity. This collected moisture may then pass through a drain 90, 92, 94, 96. Additionally, outlet ports 98 may be defined proximate top circumferential portion 78' of pedestal 78 (as viewed in FIG. 8). Such an orientation of outlet ports 98 may make it less likely for droplets to inadvertently flow through outlet ports 98 and then to downstream components of the PSA system. To assist in properly orienting filter housing 52 horizontally, sidewalls 56, 58 may meet to form an extended vertex 64' when compared to vertices 62, 66, 68. Thus, a user may be able to identify which vertex (i.e., vertex 64') should be aligned downwardly (with reference to FIG. 8) so as to position drains 90, 92, 94, 96 and outlet ports 98 as described above. In this manner, a single coalescing filter 50 may be mounted in either a vertical or horizontal orientation.

While the above description has been directed toward a filter housing 52 having four sidewalls 54, 56, 58, 60 configured to present a four-sided star-shaped cross section, it should be understood by those skilled in the art that alternative housing configurations may be constructed which have three or more sidewalls meeting at respective vertices. These sidewalls may be either planar or have a concave curvature relative to the central axis of the housing.

The foregoing description of the preferred embodiment of the invention has been presented for the purpose of illustration and description. It is not intended to be exhaustive nor is it intended to limit the invention to the precise form disclosed. It will be apparent to those skilled in the art that the disclosed embodiments may be modified in light of the above teachings. The embodiments described are chosen to provide an illustration of principles of the invention and its practical application to enable thereby one of ordinary skill in the art to utilize the invention in various embodiments and with various modifications as are suited to the particular use contemplated. Therefore, the foregoing description is to be considered exemplary, rather than limiting, and the true scope of the invention is that described in the following claims.

What is claimed is:

1. A coalescing filter comprising:
   a) a housing including a sidewall defining a central chamber configured to receive a filter element therein;
   b) a top fitting coupled to a top end of the housing and including an inlet port configured to receive a moist source gas and direct the moist source gas into the filter element; and
   c) a bottom fitting coupled to a bottom end of the housing and including an outlet orifice configured to discharge a dry product gas,
   wherein the bottom fitting includes a pedestal configured to extend within the central chamber a spaced distance from the plurality of sidewalls, wherein the pedestal is configured to seat the filter element thereon, the pedestal further including an outlet port in fluid communication with the outlet orifice.

2. The coalescing filter of claim 1 wherein the sidewall comprises a plurality of sidewall panels wherein adjacent sidewall panels are joined at a vertex to thereby define a housing having a non-circular lateral cross section.

3. The coalescing filter of claim 2 wherein the plurality of sidewall panels are planar.

4. The coalescing filter of claim 2 wherein the plurality of sidewall panels include a concave curvature relative to a central longitudinal axis of the housing.

5. The coalescing filter of claim 2 wherein the bottom fitting further defines a plurality of pockets wherein a respective pocket is located proximate a respective vertex and wherein each respective pocket is in fluid communication with a respective pair of sidewall panels.

6. The coalescing filter of claim 5 wherein the bottom fitting further defines a plurality of drains wherein a respective drain is in fluid communication with a respective pocket wherein droplets extracted from the moist source air exit the coalescing filter through one of the plurality of drains.

7. The coalescing filter of claim 6 wherein the outlet port is located a spaced distance above the plurality of drains.

8. The coalescing filter of claim 2 wherein the plurality of sidewalls is four.

9. The coalescing filter of claim 4 wherein the plurality of sidewalls is four and wherein the concave curvature of the plurality of sidewalls forms a housing having a four-pointed star lateral cross section.

* * * * *